United States Patent
Goralski et al.

(10) Patent No.: US 6,293,093 B1
(45) Date of Patent: Sep. 25, 2001

(54) METHOD AND SYSTEM FOR DIRECTLY MONITORING THE EFFICIENCY OF A CONDITIONING CATALYST HAVING NEGLIGIBLE OXYGEN STORAGE CAPACITY

(75) Inventors: Christian Thomas Goralski, Ypsilanti; William P. Boone, Northville; Richard E. Soltis, Saline, all of MI (US)

(73) Assignee: Ford Global Technologies, INC, Dearborn, MI (US)

( * ) Notice: Subject to any disclaimer, the term of this patent is extended or adjusted under 35 U.S.C. 154(b) by 0 days.

(21) Appl. No.: 09/631,133

(22) Filed: Aug. 2, 2000

(51) Int. Cl.$^7$ ........................................................ F01N 3/00
(52) U.S. Cl. ........................... 60/277; 204/424; 205/784.5
(58) Field of Search ........................... 60/277, 285, 288; 204/421, 424, 425, 426, 427, 428, 429; 205/783.5, 784, 784.5, 785

(56) References Cited

U.S. PATENT DOCUMENTS

| | | | |
|---|---|---|---|
| 4,132,615 | * | 1/1979 | Linder et al. ................. 423/213.5 |
| 4,961,835 | | 10/1990 | Kobayashi et al. . |
| 5,007,988 | | 4/1991 | Archer et al. . |
| 5,296,112 | * | 3/1994 | Seger et al. ................. 204/424 |
| 5,340,462 | * | 8/1994 | Suzuki ....................... 204/425 |
| 5,391,282 | | 2/1995 | Miyashita et al. . |
| 5,649,420 | | 7/1997 | Mukaihira et al. . |
| 5,667,652 | * | 9/1997 | Liu et al. ...................... 204/424 |
| 5,706,652 | | 1/1998 | Sultan . |

(List continued on next page.)

FOREIGN PATENT DOCUMENTS

| | | |
|---|---|---|
| 62-200232 | 2/1989 | (JP) . |
| 403021859 | * 1/1991 | (JP) . |

OTHER PUBLICATIONS

"Ford Engineers Lauded for Super–Clean Breakthrough", Mar. 31, 1998, http://www.theauthochannel.com/content/news/press/dat.../press011076.html.

Sanath V. Kumar and Ronald M. Heck, "A New Approach to OBDIT Monitoring of Catalyst Performance Using Dual Oxygen Sensors", SAE Technical Paper Series 2000–01–0863, SAE 200 World Congress, Detroit, Michigan, Mar. 6–9, 2000.

(List continued on next page.)

*Primary Examiner*—Thomas Denion
*Assistant Examiner*—Diem Tran
(74) *Attorney, Agent, or Firm*—Lorraine S. Melotik; Gigette M Bejin

(57) ABSTRACT

An on-board diagnostic system and method for directly monitoring the efficiency of a catalyst having negligible oxygen storage capacity is provided. The monitoring system includes an oxygen sensor mounted at a first end of the conditioning catalyst, and an exhaust gas catalyst bypass. The oxygen sensor includes a first side and a second side. The first side detects oxygen levels in the exhaust gas at or near the first end of the catalyst and the second side detects oxygen levels at or near the second end of the catalyst. The oxygen sensor simultaneously compares exhaust gas from the first end of the catalyst to the exhaust gases from the second end of the catalyst. The oxygen sensor produces a voltage signal which is proportional to the difference in oxygen levels between the upstream gases and the downstream gases. The method of the present invention includes providing an oxygen sensor and an exhaust gas catalyst bypass; transferring exhaust gas via the exhaust gas catalyst bypass to a second side of the oxygen sensor; simultaneously detecting oxygen levels in the exhaust gas at the first side and the second side of the oxygen sensor; and producing a voltage which is directly proportional to the amount of oxygen converted over the catalyst.

16 Claims, 2 Drawing Sheets

U.S. PATENT DOCUMENTS

| | | | |
|---|---|---|---|
| 5,845,487 | | 12/1998 | Fraenkle et al. . |
| 5,938,715 | | 8/1999 | Zhang et al. . |
| 5,948,966 | * | 9/1999 | Takahashi et al. .................. 204/427 |
| 5,956,945 | | 9/1999 | Kumar et al. . |
| 6,149,786 | * | 11/2000 | Partick et al. ....................... 204/421 |
| 6,182,498 | * | 2/2001 | Mizutani et al. .................... 204/425 |

OTHER PUBLICATIONS

Dale J. Long, "Sensors, An Integral Part of Today's Automobile", http://et.nmsu.edu/~etti/winter99/manufacturing/long/long.html.

Mitch Jacoby, "Getting Auto Exhausts To Pristine", Science–Technology, Jan. 25, 1999, vol. 77, No. 4, http://jknee2.chem.wesleyan.edu/chem142/Articles/CENEWS-Catalyst_Article.html.

"Present Technology", http://www.bergen.org/AAST/Projects/ES/TA/prestech2.html.

"Ford Scores Another Emissions [First]: Expands Crown Victoria Range", http://www.gri.org/pub/oldcontent/pubs3/ngv/ford.html.

"On Board Diagnostics", http://www.cryptontechnology.com/EODB.htm.

* cited by examiner

METHOD AND SYSTEM FOR DIRECTLY MONITORING THE EFFICIENCY OF A CONDITIONING CATALYST HAVING NEGLIGIBLE OXYGEN STORAGE CAPACITY

TECHNICAL FIELD

This invention relates to on-board diagnostics and, more particularly, to an on-board diagnostic method and system on motor vehicles that can diagnose the efficiency of a catalyst having negligible oxygen storage capacity.

BACKGROUND ART

Today's engineers strive toward the goal of perfecting the efficiency of automotive engines by achieving lower emissions, better fuel efficiency, and improved performance. Government regulations require on-board diagnostics computers (On-Board Diagnostics or OBD) to further these goals. OBDs have been employed in motor vehicles since the late 1980s. The OBD system has been vastly improved to On-Board Diagnostics Level 2 ("OBD II"). OBD II not only monitors the partial failure of components but the deterioration of components as well.

With respect to the goal of lowering emissions, feedback control has been implemented with the engine/emission system to ensure that the optimum mixture of the gases is delivered to the catalytic converter. In general, an emissions system includes a three-way catalyst in the exhaust path to target particular components of the exhaust gases for the purpose of converting the targeted components to more environmentally friendly gases. For example, the three way catalysts convert HC, CO and NO, from the exhaust gas to $H_2O$, $CO_2$ and $N_2$.

Oxygen sensors have proven helpful in providing feedback control in emissions systems. In FIG. 1a, a typical oxygen sensor of the prior art and its conventional implementation in an emissions system are illustrated. The oxygen sensor 12 includes an oxygen permeable material and is generally mounted onto the exhaust system 14 near the exhaust manifold (not shown). The oxygen sensor 12 is used to maintain a stoichiometric air-fuel ratio by monitoring the oxygen content of the exhaust gas 16. The sensor 12 compares the oxygen level in the outside air 18 to the oxygen level in the exhaust gases 16. The sensor may further include a platinum tip 20 which is in direct contact with the exhaust gases 16. The platinum in the tip 20 equilibrates the gases and develops a voltage signal which is sent to a powertrain control module (not shown) for purposes of providing feedback to the air-fuel delivery system.

With reference to FIG. 1b, a prior art OBDII monitoring system 13 is illustrated. This prior art system monitors the oxygen storage ability of the catalyst. This indirect system and method of the prior art infers the deterioration in the hydrocarbon efficiency from changes in oxygen storage in the catalyst over time. As shown in FIG. 1b, a first oxygen sensor 22 is positioned at the upstream end 23 of a catalyst 24 and a second oxygen sensor 26 is positioned at the downstream end 28 of the catalyst. The first oxygen sensor 22 and the second oxygen sensor 26 measure the change in oxygen storage across the catalyst. The catalyst 24 may include oxygen storage material such as cerium. The first oxygen sensor 22 and the second oxygen sensor 26 collect data which track the oscillation between a rich condition and a lean condition of the exhaust gas. The collected data may be transmitted to a corresponding first signal processing means 28 and a second signal processing means 30 which are in communication with a means 32 for determining the switch ratio of the outlet sensor 26 to the inlet sensor 22. In determining the switch ratio, the system compares the rich-lean oscillation of the exhaust gas at the upstream side to the rich-lean oscillation at the downstream side of the catalyst.

However, as described above, this system and method do not provide a direct means of measuring oxidation efficiency given that the two sensors infer the oxidation efficiency based upon the catalyst oxygen storage capacity determined from a measurable quantity such as a voltage difference or a switch ratio. This indirect method assumes that the hydrocarbon efficiency of the system is adverse where the oxygen storage capacity of the catalyst is also adverse. However, the correlation between these two factors is approximately 0.6 to 0.7 at best. As known by those skilled in the art, the oxygen storage capacity may greatly vary despite very little change in the hydrocarbon efficiency.

Under a new emission-control system, a conditioning catalyst may be implemented for purposes of preventing "lean shift" in the control air-fuel ratio. "Lean shift" is a problem which occurs when the sensor incorrectly indicates that the hydrogen-laden exhaust gas is too rich and causes the engine control system to provide a leaner air fuel mixture. Conditioning catalysts help ensure accurate air-fuel control where very low emissions levels are mandated (e.g., California's Super Ultra Low Emission Vehicle (SULEV) standards). In this type of system, the exhaust gas stream is conditioned by a catalyst before the exhaust gas stream gets to the oxygen sensor by oxidizing the hydrogen and some of the hydrocarbons so that the sensor may more accurately measure the true air-fuel ratio of the exhaust. However, the catalyst in this system does not contain oxygen storage material given that the sensor must detect the oscillation between a rich condition and a lean condition at the downstream end of the conditioning catalyst to provide feedback control to the engine.

With negligible oxygen storage capacity in the catalyst, the conventional OBDII method of monitoring the deterioration of a catalyst (with dual sensors as described above) is no longer useful given that oscillation between a rich condition and a lean condition at the upstream side of the catalyst will be the same as the oscillation at the downstream side of the catalyst. Accordingly, a need has developed for a system and direct method that accurately diagnose the efficiency of a conditioning catalyst having negligible oxygen storage capacity.

DISCLOSURE OF THE INVENTION

It is a principal object of the present invention to provide a system that precisely and directly diagnoses the oxidation efficiency of a catalyst having negligible oxygen storage capacity.

It is another object of the present invention to provide a method of precisely and directly monitoring the efficiency of a catalyst having negligible oxygen storage capacity.

It is still another object of the present invention to provide a system that precisely and directly diagnoses the oxidation efficiency of a catalyst.

It is yet another object of the present invention to provide a method of precisely and directly monitoring the efficiency of a catalyst.

It is yet another object of the present invention to provide a new method of implementing an oxygen sensor in a vehicle.

It is still another object of the present invention to provide a system which implements a differential oxygen sensor that simultaneously compares oxygen levels at the upstream end and the downstream end of a catalyst.

In carrying out the above objects and other objects and features, a system for directly monitoring the efficiency of a catalyst having negligible oxygen storage capacity is provided. The monitoring system includes an oxygen sensor mounted in the vehicle exhaust system near a first end of a catalyst and an exhaust gas catalyst bypass. The oxygen sensor includes a first side and a second side. The first side detects the oxygen levels in the exhaust gases at the first end of the catalyst. The exhaust gas catalyst bypass transfers a small amount of exhaust gas from the second end of the catalyst to the second side of the oxygen sensor. The oxygen sensor performs an instantaneous comparison of the oxygen levels between the exhaust gases at the first end of the catalyst and the exhaust gases at the second end of the catalyst thereby producing a voltage signal. The voltage signal generated by the sensor is proportional to the difference in oxygen levels between the gases at the first end and the second end of the oxygen sensor. The voltage signal may then be transmitted to the vehicle's powertrain control module to provide feedback to the engine.

A method is also provided for directly monitoring the efficiency of a catalyst having negligible oxygen storage capacity. This method includes: providing an oxygen sensor mounted in the vehicle exhaust system near a first end of the catalyst, the oxygen sensor having a first side and a second side; providing an exhaust gas catalyst bypass; transferring exhaust gas from a second end of the catalyst via the exhaust gas catalyst bypass to the second side of the oxygen sensor; simultaneously comparing oxygen levels in the exhaust gas at the first side of the oxygen sensor to the oxygen levels in exhaust gas at the second side of the oxygen sensor; and producing a voltage in the oxygen sensor where the voltage is directly proportional to the amount of oxygen converted over the catalyst.

BEST MODES FOR CARRYING OUT THE INVENTION

Figure 1A:
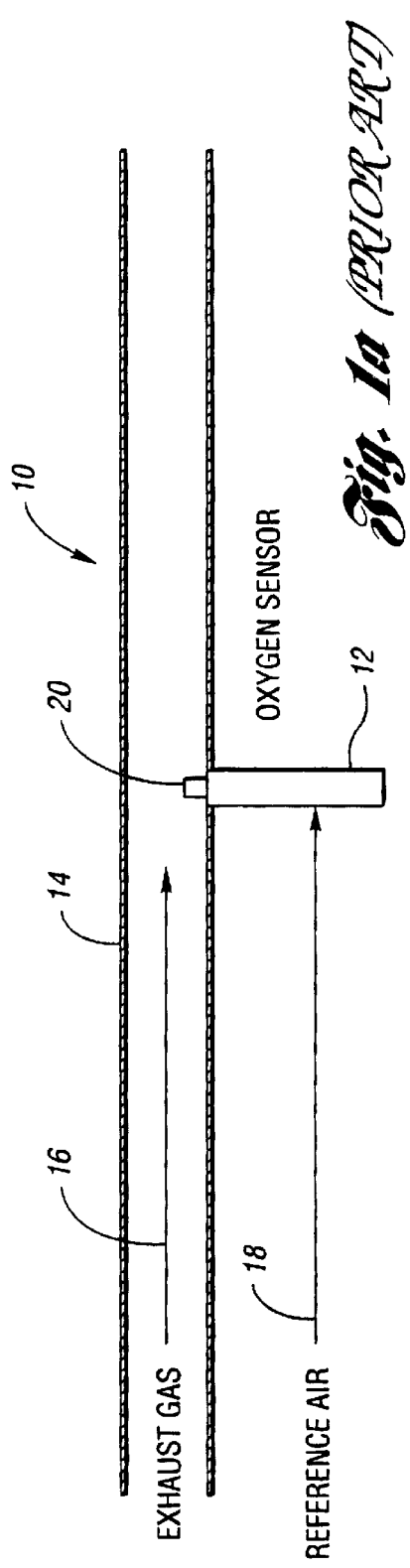
FIG. 1a is a schematic diagram illustrating the conventional implementation of an oxygen sensor in an emissions system.
Figure 1B:
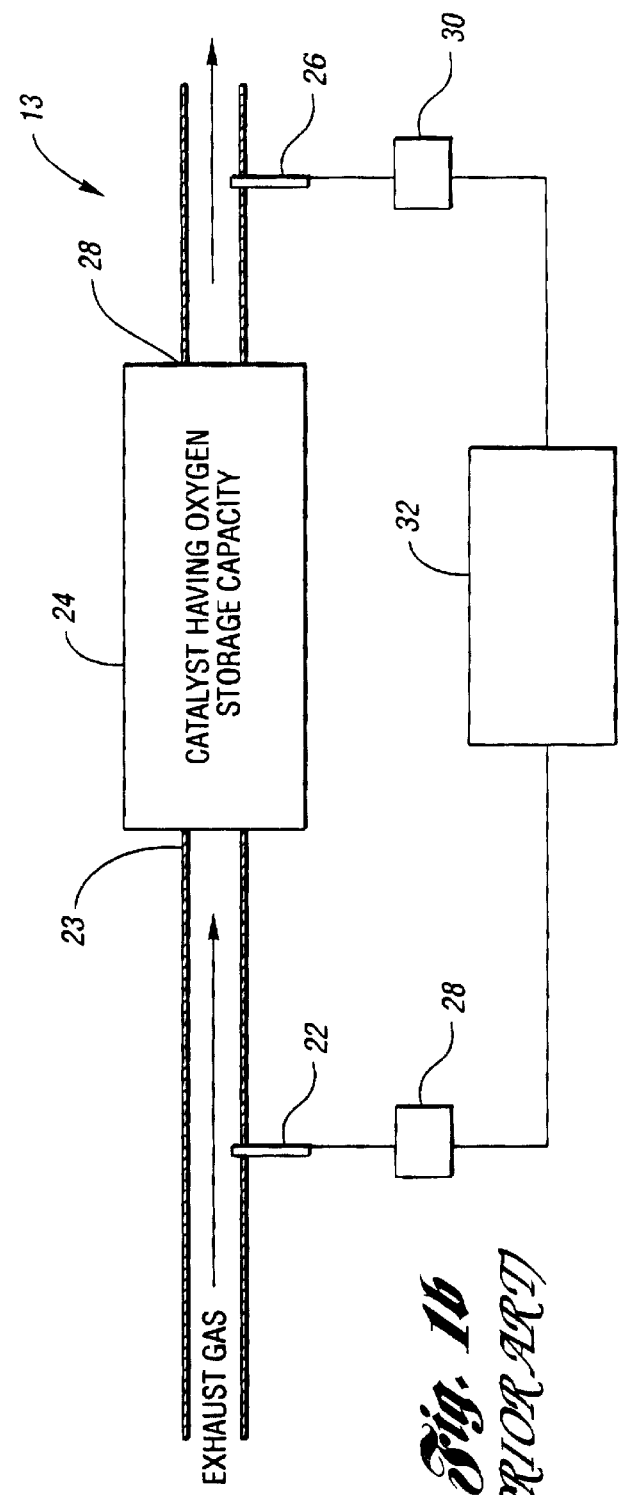
FIG. 1b is a schematic diagram of a conventional OBDII dual sensor monitoring system where the three-way catalyst includes oxygen storage capacity.
Figure 2:
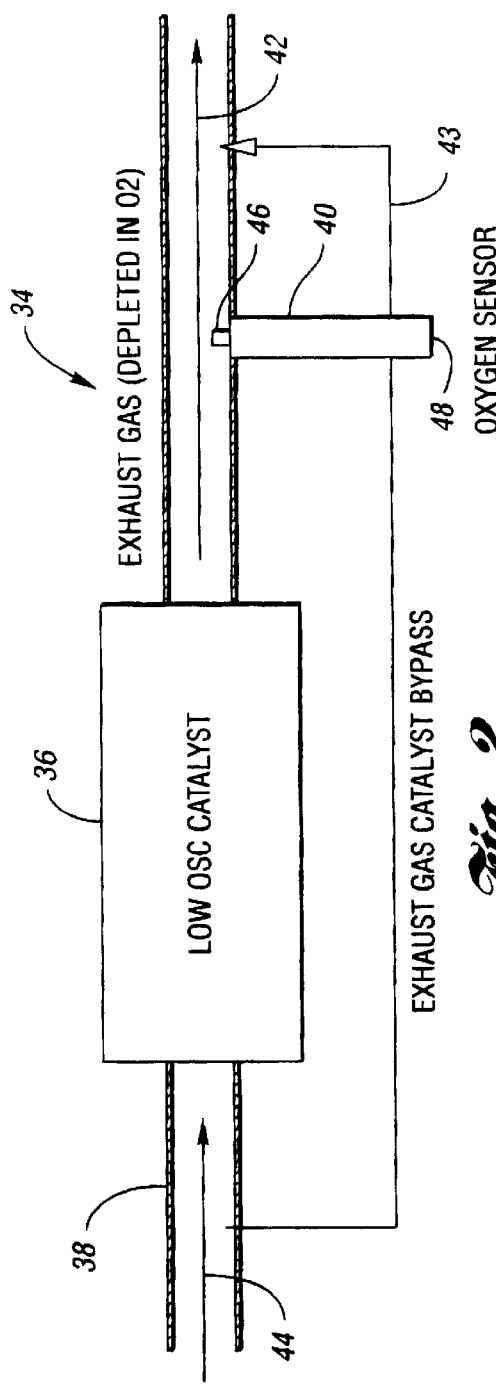
FIG. 2 is a schematic diagram showing an embodiment of the system of the present invention.

With reference to FIG. 2, a first embodiment of the system 34 of the present invention is illustrated. The on-board diagnostic system and method of the present invention directly monitors the efficiency of a catalyst 36 having negligible oxygen storage capacity. A catalyst 36 is positioned in the exhaust path 38 of the engine. The catalyst 36 has negligible oxygen storage capacity.

In this embodiment, the catalyst 36 may be placed closer to the engine (not shown) in order to attain an increased catalyst temperature at a faster rate. Further, the catalyst 36 is positioned before the oxygen sensor 40 in order to reduce the problem known as "lean shift." By placing the catalyst 36 before the oxygen sensor 40, the oxygen sensor 40 is able to more accurately read the oxygen levels in the exhaust gas.

The oxygen sensor 40 may be typically formed, in part, of ceramic material. As the exhaust gas 42 comes into contact with the sensor 40, hydrogen more readily permeates the ceramic material relative to the hydrocarbons and the carbon monoxide. Accordingly, this causes the sensor 40 to indicate a rich bias. By placing the catalyst before the oxygen sensor, the catalyst 36 effectively removes excess hydrogen from the exhaust gas 42 thereby delivering a more desirable exhaust-gas composition for the sensor 40.

The oxygen sensor 40 is preferably but not necessarily comprised of yttria-stabilized zirconia ceramic material which is impregnated with gold. Gold is a preferable material as gold is a conductor but not catalytic. Other materials with similar characteristics to gold may be used in the alternative.

Referring back to FIG. 2, the system 34 of the present invention may include a sensor 40 located downstream of the catalyst 36 and an exhaust gas catalyst bypass 43. The exhaust gas catalyst bypass 43 shown in FIG. 2 is operative to transfer a small amount of upstream exhaust gas 44 to the sensor 40. The sensor 40 is a differential sensor 40 having a reference side 48 and a sample side 46. The sample side 46 of the sensor 40 compares the oxygen levels in the downstream exhaust gas 42 to the oxygen levels in the upstream exhaust gas 44 sampled on the reference side 48. The differential measurements in the sensor 40 sets up a potential thereby producing a voltage. When oxygen is converted over the catalyst 36 by reacting with carbon monoxide, hydrogen, and hydrocarbons, there will be less oxygen in the downstream gases 42 than in the upstream gases 44. The differential measurements under these circumstances will produce a voltage in the sensor 40 indicating that the catalyst 36 is functioning properly. If the catalyst 36 fails and no longer converts carbon monoxide, hydrogen, and hydrocarbons, oxygen will not be converted and the upstream and downstream concentrations of the gases will remain the same as indicated by the voltage signal generated in the sensor 40. Generally, the voltage signal produced by the oxygen sensor 40 is proportional to the amount of oxygen converted over the catalyst.

The sensor 40 of the present invention may, but not necessarily, include a sample side 46 having two types of electrodes. The first sample side electrode detects oxygen levels in the exhaust gas for purposes of diagnosing the efficiency of the catalyst and the second sample side electrode detects oxygen levels in the exhaust gas for purposes of providing feedback to the engine.

Furthermore, the oxygen sensor 40 of the present invention requires a very small sample of the upstream exhaust gas. Approximately 10 sccm has been found to be a sufficient amount of upstream exhaust gas transferred through the exhaust gas bypass. However, greater or lesser quantities of exhaust gas may be transferred.

Alternatively, the oxygen sensor 40 may be placed at the upstream end 38 of the catalyst. Again, the oxygen sensor 40 may have a reference side 48 and a sample side 46. The sample side 46 is operative to detect oxygen levels in the upstream exhaust gases 44. In this arrangement, the exhaust gas catalyst bypass 43 transfers downstream exhaust gases 42 to the reference side 48 of the oxygen sensor 40. The oxygen sensor 40 then simultaneously compares the oxygen levels at the reference side 48 and the sample side 46 thereby producing a voltage signal. The voltage signal is proportional to the difference in the oxygen levels in the exhaust gases between the upstream exhaust gases 44 and the downstream exhaust gases 42.

In yet another alternative arrangement, two exhaust gas catalyst bypasses may be implemented and the oxygen sensor 40 may be mounted away from the exhaust path. Again, the oxygen sensor 40 includes a first side and a second side. A first exhaust gas catalyst bypass transfers exhaust gases from or near the first end of the catalyst to the first side of the oxygen sensor. The second exhaust gas catalyst bypass transfers exhaust gases from or near the second end of the catalyst to the second side of the oxygen sensor. The first side detects oxygen levels in the exhaust gases at the first end of the catalyst. The second side of the oxygen sensor detects oxygen levels in the exhaust gases at the second end of the catalyst. The oxygen sensor simultaneously compares the oxygen levels at the first side and the second side and produces a voltage which is proportional to the difference between the oxygen levels at the first end of the catalyst and second end of the catalyst. The voltage signal may then be transmitted to an powertrain control module or the like for providing feedback to the engine. The exhaust gas transferred to the oxygen sensor may be released through a separate valve or returned to the exhaust system of the vehicle.

Figure 3:
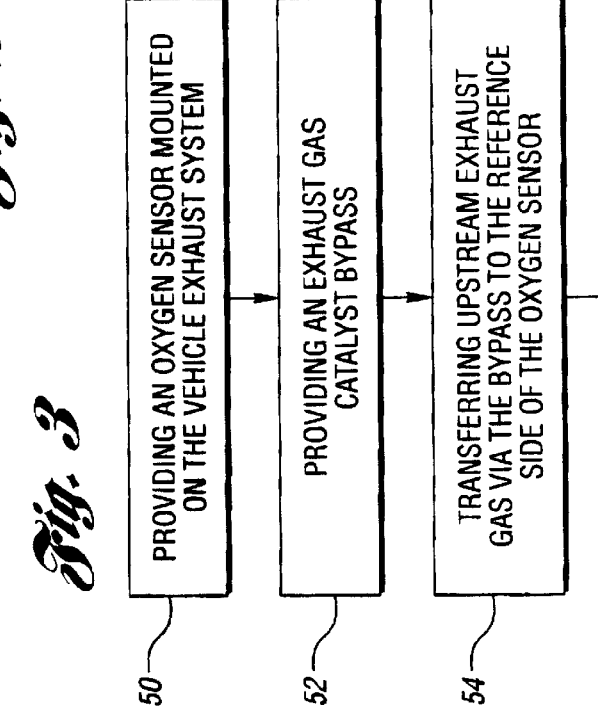
FIG. 3 is a flowchart which illustrates an embodiment of the method of the present invention.

With reference to FIG. 3, one method of the present invention is illustrated in a flowchart figure format. The first step of the method is providing 50 an oxygen sensor mounted in the vehicle exhaust system downstream of the catalyst. The oxygen sensor has a reference side and a sample side. The second step of the method includes providing an exhaust gas catalyst bypass 52. Third, upstream exhaust gas is transferred 54 to the reference side of the oxygen sensor via the exhaust gas catalyst bypass. Fourth, oxygen levels are simultaneously compared 56 in the upstream exhaust gas at the reference side of the oxygen sensor and in the downstream exhaust gas at the sample side of the oxygen sensor. Fifth, a voltage is produced 58 in the oxygen sensor. The voltage produced is proportional to the amount of oxygen converted over the catalyst. The voltage signal may then be transmitted 60 to the powertrain control module (PCM) to provide feedback. By directly measuring the amount of oxygen being converted over the catalyst, the amount of HC and Co being converted over the catalyst can also be directly measured.

An alternative method of the present invention includes providing an oxygen sensor mounted in the vehicle exhaust system at a first end of the catalyst where the oxygen sensor has a first side and a second side. An exhaust gas catalyst bypass transferring exhaust gas from a second end of the catalyst to the second side of the oxygen sensor is also provided. The exhaust gas is transferred from the second end of the catalyst via the exhaust gas catalyst bypass to the second side of the oxygen sensor. The oxygen levels in the exhaust gas at the first side of the oxygen sensor are compared to the oxygen levels in the exhaust gas at the second side of the oxygen sensor. A voltage is produced in the oxygen sensor where the voltage being proportional to the amount of oxygen converted over the catalyst.

The words in the specification are words of description rather than limitation, and it is understood that various changes may be made without departing from the spirit and scope of the invention.

While the best modes for carrying out the invention have been described in detail, those familiar with the art to which this invention relates will recognize various alternative designs and embodiments for practicing this invention as defined by the following claims.

What is claimed is:

1. An on-board diagnostic system for directly monitoring the efficiency of a catalyst having negligible oxygen storage capacity, the system comprising:

an oxygen sensor mounted in a vehicle exhaust system at a first end of a catalyst, the oxygen sensor having a first side and a second side, the first side of the oxygen sensor detecting oxygen levels at the first end of the catalyst; and an exhaust gas catalyst bypass for providing exhaust gas from a second end of the catalyst to the second side of the oxygen sensor, whereby the oxygen sensor simultaneously compares the oxygen levels at the first end of the catalyst to the oxygen levels at the second end of the catalyst producing a voltage signal in the sensor, the voltage signal being directly proportional to the difference in oxygen levels at the first end and the second end of the catalyst.

2. The system defined in claim 1, wherein the catalyst converts CO, HC and $NO_x$, to $H_2O$, $CO_2$, and $N_2$.

3. The system defined in claim 1, wherein the catalyst is operative to convert hydrogen to water to prevent interference of the hydrogen with the air-fuel ratio control.

4. The system defined in claim 1, wherein the catalyst converts CO and HC to $CO_2$ and $H_2O$.

5. The system defined in claim 1, wherein the oxygen sensor transmits a signal to a powertrain control module.

6. The system defined in claim 1, wherein the sensor includes an inert electrode.

7. The system defined in claim 1, wherein the first side of the sensor includes a first electrode and a second electrode, the first electrode operative to compare oxygen levels in the exhaust gases for diagnosing catalyst efficiency, the second electrode operative to compare oxygen levels in the exhaust gases for providing feedback to the engine.

8. An on-board diagnostic system for directly monitoring the efficiency of a catalyst having negligible oxygen storage capacity, the system comprising:

an oxygen sensor mounted in a vehicle exhaust system downstream of the catalyst, the oxygen sensor having a reference side and a sample side, the sample side detecting oxygen levels in the downstream exhaust gases; and an exhaust gas catalyst bypass for providing upstream exhaust gas to the reference side the oxygen sensor, whereby the oxygen sensor simultaneously compares the oxygen levels in the upstream gases to the oxygen levels in the downstream gases producing a voltage signal in the sensor, the voltage signal being proportional to the difference in oxygen levels between the upstream gases and the downstream gases.

9. The system defined in claim 8, wherein the catalyst converts CO, HC and $NO_x$ to $H_2O$ and $C_2O$.

10. The system defined in claim 8, wherein the catalyst is operative to convert hydrogen to water to prevent interference of the hydrogen with the air-fuel ratio control.

11. The system defined in claim 8, wherein the oxygen sensor transmits a signal to a powertrain control module.

12. The system defined in claim 8, wherein the sensor includes an inert electrode.

13. The system defined in claim 8, wherein the sample side of the sensor includes a first electrode and a second electrode, the first electrode operative to compare oxygen levels in the exhaust gases for diagnosing catalyst efficiency to the reference side, the second electrode operative to detect oxygen levels in the exhaust gases for providing feedback to the engine.

14. A method for directly monitoring the efficiency of a catalyst having negligible oxygen storage capacity, the method comprising:

providing an oxygen sensor mounted in the vehicle exhaust system downstream of the catalyst, the oxygen sensor having a reference side and a sample side, the first side of the oxygen sensor being operative to detect oxygen levels at the first end of the catalyst;

providing an exhaust gas catalyst bypass;

transferring upstream exhaust gas via the exhaust gas catalyst bypass to the reference side of the oxygen sensor;

comparing oxygen levels in the upstream exhaust gas at the reference side of the oxygen sensor to the oxygen levels in the downstream exhaust gas at the sample side of the oxygen sensor; and producing a voltage in the oxygen sensor, the voltage being proportional to the amount of oxygen converted over the catalyst.

15. The method defined in claim 14, the method further comprising transmitting a signal from the oxygen sensor to a powertrain control module for modifying the fuel-air mixture.

16. A method for directly monitoring the efficiency of a catalyst having negligible oxygen storage capacity, the method comprising:

providing an oxygen sensor mounted in the vehicle exhaust system at a first end of the catalyst, the oxygen sensor having a first side and a second side, the first side of the oxygen sensor being operative to detect oxygen levels at the first end of the catalyst;

providing an exhaust gas catalyst bypass;

transferring exhaust gas from the second end of the catalyst via the exhaust gas catalyst bypass to the second side of the oxygen sensor;

comparing oxygen levels in the exhaust gas at the first side of the oxygen sensor to the oxygen levels in the exhaust gas at the second side of the oxygen sensor; and producing a voltage in the oxygen sensor, the voltage being proportional to the amount of oxygen converted over the catalyst.

* * * * *